(12) United States Patent
Huber et al.

(10) Patent No.: US 10,678,252 B2
(45) Date of Patent: Jun. 9, 2020

(54) SYSTEMS, APPARATUS, AND METHODS FOR EMBEDDED ENCODINGS OF CONTEXTUAL INFORMATION USING A NEURAL NETWORK WITH VECTOR SPACE MODELING

(71) Applicant: GM GLOBAL TECHNOLOGY OPERATIONS LLC, Detroit, MI (US)

(72) Inventors: Marcus J. Huber, Saline, MI (US); Praveen Palanisamy, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 16/059,403

(22) Filed: Aug. 9, 2018

(65) Prior Publication Data

US 2020/0050207 A1 Feb. 13, 2020

(51) Int. Cl.
| | | |
|---|---|---|
| *G05D 1/02* | (2020.01) | |
| *G05D 1/00* | (2006.01) | |
| *G06N 3/08* | (2006.01) | |
| *G06K 9/00* | (2006.01) | |
| *G06N 3/04* | (2006.01) | |
| *G06F 40/30* | (2020.01) | |

(52) U.S. Cl.
CPC ......... *G05D 1/0221* (2013.01); *G05D 1/0088* (2013.01); *G06F 40/30* (2020.01); *G06K 9/00335* (2013.01); *G06N 3/04* (2013.01); *G06N 3/08* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 10,442,444 B1* | 10/2019 | Bando | .................... | B60W 40/09 |
| 2015/0178620 A1* | 6/2015 | Ascari | .................... | G06N 3/049 |
| | | | | 706/21 |
| 2019/0370598 A1* | 12/2019 | Martin | .................. | G06K 9/6267 |

OTHER PUBLICATIONS

Chen, "Extracting Cognition Out of Images for the Purpose of Autonomous Driving", A Dissertation Presented to the Faculty of Princeton University in Candidacy for the Degree of Doctor of Philosophy, May 2016, p. 122-142 (Year: 2016).*

(Continued)

*Primary Examiner* — Tamara L Weber
(74) *Attorney, Agent, or Firm* — Lorenz & Kopf LLP

(57) ABSTRACT

Systems, Apparatuses and Methods for implementing a neural network system for controlling an autonomous vehicle (AV) are provided, which includes: a neural network having a plurality of nodes with context to vector (context2vec) contextual embeddings to enable operations of the AV; a plurality of encoded context2vec AV words in a sequence of timing to embed data of context and behavior; a set of inputs which comprise: at least one of a current, a prior, and a subsequent encoded context2vec AV word; a neural network solution applied by the at least one computer to determine a target context2vec AV word of each set of the inputs based on the current context2vec AV word; an output vector computed by the neural network that represents the embedded distributional one-hot scheme of the input encoded context2vec AV word; and a set of behavior control operations for controlling a behavior of the AV.

20 Claims, 6 Drawing Sheets

(56) References Cited

OTHER PUBLICATIONS

Melamud et al., "context2vec: Learning Generic Context Embedding with Bidirectional LSTM", Proceedings of The 20th SIGNLL Conference on Computational Natural Language Learning, Association for Computational Linguistics, Berlin, Germany, Aug. 2016, p. 51-61 (Year: 2016).*
Habermann et al., "Road Junction Detection from 3D Point Clouds", 2016 International Joint Conference on Neural Networks ( IJCNN), 2016, p. 4934-4940 (Year: 2016).*
Mikolov, T et al (Jan. 2013). Efficient Estimation of Word Representations in Vector Space. 2013arXiv:1301.3781M.

* cited by examiner

SYSTEMS, APPARATUS, AND METHODS FOR EMBEDDED ENCODINGS OF CONTEXTUAL INFORMATION USING A NEURAL NETWORK WITH VECTOR SPACE MODELING

BACKGROUND

The technical field generally relates to contextual modeling of autonomous decision making, and more particularly relates to systems, apparatuses, and methods to embed contextual information into a vector space model to facilitate subsequent lookup, comparison, hypothesizing operations, and associated control of operations of an autonomous vehicle.

As the level of vehicle automation or autonomous functionality continues to increase, the automotive vehicle is more becoming a multi-sensor computational system that is tasked with higher order functionalities such as an understanding of the state of the driver and the state of the driving environment. The system is then tasked with more complex decisions such as requiring processing solutions to be able to identify, understand and adapt to the surroundings during autonomous vehicle operation (e.g. drive slowly when pedestrians are nearby or when driving on poorly maintained roads). To enable the autonomous vehicle to understand and to make complex decisions, there needs to be not only the ability to receive enough information about the surrounding environment but also a processing framework disposed within the vehicle that enables the autonomous vehicle systems to model inputted information and quickly comprehends and processes the information to make the appropriate vehicular control decisions.

The use of machine processing using embedded encodings has been explored in the past primarily with respect to applications in linguistics and other domains, but little, if any, applications of this technology are found or applied in the field of autonomous robotics (i.e. autonomous vehicle systems). The use of such technology has been surmised to have applicability with autonomous vehicle operations in driving scenarios by the use of context embedding vector spaces.

Accordingly, it is desirable to embed contextual information into a vector space model for the following: to facilitate later context matching and action selection, to enable mapping of semantically similar contexts deemed close together, to enable algorithmic solutions for vectors to preserve semantic and syntactic relationships, to forward predict likely contextual scenarios with optimum current control actions, from target contextual objects of systems, apparatuses and methods of an autonomous vehicle. Furthermore, other desirable features and characteristics of the present invention will become apparent from the subsequent detailed description and the appended claims, taken in conjunction with the accompanying drawings and the foregoing technical field and background.

SUMMARY

A system, apparatus and method to embed contextual information into a vector space model to facilitate subsequent lookup, comparison, and hypothesizing operations associated with autonomous vehicle operations is disclosed.

In one embodiment, a computer-implemented system for controlling an autonomous vehicle (AV) is provided. The system includes: a non-transitory computer-readable containing a set of instructions for programming at least one computer, the at least one computer including: a neural network having a plurality of nodes with context to vector (context2vec) contextual embeddings to enable operations of the AV; a plurality of encoded context2vec AV words in a sequence of timing to embed data of context and behavior derived from sensor data of the AV in time sequences wherein the context and behavior data include: at least mapping, situational, and behavior data of the AV operation; a set of inputs to the neural network which include: at least one of a current, a prior, and a subsequent encoded context2vec AV word each represented in a one-hot scheme of a set of possibilities of context2vec AV words wherein at least one context2vec AV word of the set is designated with an ON state while other context2vec AV words of the set are designated in an OFF state; a neural network solution applied by the at least one computer to determine a target context2vec AV word of each set of the inputs based on the current context2vec AV word; an output vector computed by the neural network that represents the embedded distributional one-hot scheme of the input encoded context2vec AV word; and a set of behavior control operations for controlling, by the at least one computer, a behavior of the AV based on the context2vec AV word.

In various embodiment, the system provides: the mapping, situational, and behavior data embedded in the context2vec AV word further including: a first, a second, a third, a fourth and a fifth part wherein the first part includes: intersection and stop mapping data; the second part which includes: clear distance ahead and time to collision situational data; the third part which includes: speed target and lane intention situational data; the fourth part which includes: clear distance ahead and expected maneuver behavior data; and the fifth part which includes: relative location and expected maneuver behavior data to enable a control action by the at least one computer of the AV. The system provides: the plurality of context2vec AV words encoded in a sequence of timing further including: a prior, current and subsequent sequence of timestamps for each set of context2vec AV words. The system provides: further including: a training of a set of context2vec AV words translated by the one-hot scheme of a size m neural network of context2vec AV words; a composition with plus/minus n one-hot scheme of a neural network of context2vec AV words; and a training of the neural network with m+2n*m input nodes and m output nodes of context2vec AV words wherein m=number of input nodes selected for the size m neural network. The system provides: further including: an execution of a set of context2vec AV words translated by the one-hot scheme of a size m neural network of context2vec AV words; a composition with plus/minus n one-hot scheme of a neural network of context2vec AV words; a presentation to a trained neural network of the composition with plus/minus n one-hot scheme of context2vec AV words; and a set of output of context2vec AV word possibilities for control actions of the AV. The system provides: further including: a construction of a hypothesis of a sequence of context2vec AV words of at least a size m wherein m=a size or number of input nodes selected of the neural network of context2vec AV words; a presentation to a trained neural network of an output of the context2vec AV words based on the hypothesis; an inspection of the output of the context2vec AV words;

and a decision of an action for the AV by the at least one computer based on a result of the inspection of the context2vec AV words. The system provides: further including: a Continuous Bag-of-Words model (CBOW) and/or a Skip-Gram model using neural networks for analysis of the context2vec AV words.

In another embodiment, an apparatus for implementing a neural network system for training software embedded in an autonomous vehicle (AV) and for creating a built-in neural network for controlling the AV is provided. The apparatus includes: at least one processor deployed on a computing device within the AV, the at least one processor being programmed to implement applications to generate control data for an AV based on sensor data from sensors deployed on the AV wherein the at least one processor having an input coupled to the sensors to receive the sensor data; the at least one processor having an associated memory for storing data of context to vector (context2vec) words of AV words for use in controlling the AV; the at least one processor having a neural network having a plurality of nodes with context to vector (context2vec) contextual embeddings to enable operations of the AV; the at least one processor encoding a plurality of context2vec AV words in a sequence of timing to embed data of context and behavior derived from sensor data of the AV in time sequences wherein the context and behavior data include: at least mapping, situational, and behavior data of the AV operation; the at least one processor with a set of inputs to the neural network which include: at least one of a current, a prior, and a subsequent encoded context2vec AV word each represented in a one-hot scheme of a set of possibilities of context2vec AV words wherein at least one context2vec AV word of the set is designated with an ON state while other context2vec AV words of the set are designated in an OFF state; the at least one processor executing a neural network to determine a target context2vec AV word of each set of the inputs based on the current context2vec AV word; the at least one processor enabling an output vector computed by the neural network that represents the embedded distributional one-hot scheme of the input encoded context2vec AV word; and the at least one processor controlling, by a set of control actions, a behavior of the AV based on the context2vec AV word.

In various embodiments, the apparatus provides: the mapping, situational, and behavior data embedded in the context2vec AV word further including: a first, a second, a third, a fourth and a fifth part wherein the first part includes: intersection and stop mapping data; the second part which includes: clear distance ahead and time to collision situational data; the third part which includes: speed target and lane intention situational data; the fourth part which includes: clear distance ahead and expected maneuver behavior data; and the fifth part which includes: relative location and expected maneuver behavior data to enable a control action by the at least one computer of the AV. The apparatus provides: the plurality of context2vec AV words encoded in a sequence of timing further including: a prior, current and subsequent sequence of timestamps for each set of context2vec AV words. The apparatus further including: the at least one processor configured to: train of a set of context2vec AV words translated by the one-hot scheme of a size m neural network of context2vec AV words; compose with plus/minus n one-hot scheme of a neural network of context2vec AV words; and train the neural network with m+2n*m input nodes and m output nodes of context2vec AV words wherein m=number of input nodes selected for the size m neural network. The apparatus further including: the at least one processor configured to: execute a set of context2vec AV words translated by the one-hot scheme of a size m neural network of context2vec AV words; compose with plus/minus n one-hot scheme of a neural network of context2vec AV words; present to a trained neural network the composition with plus/minus n one-hot scheme of context2vec AV words; and output a set of context2vec AV word possibilities for control actions of the AV. The apparatus further including: the at least one processor configured to: construct a hypothesis of a sequence of context2vec AV words of at least a size m wherein m=a size or number of input nodes selected of the neural network of context2vec AV words; present to a trained neural network of an output of the context2vec AV words based on the hypothesis; inspect the output of the context2vector AV words; and decide an action for the AV based on a result of the inspection of the context2vec AV words. The apparatus, further including: the at least one processor configured to: a Continuous Bag-of-Words model (CBOW) and/or a Skip-Gram model using neural network for analysis of the context2vec AV words.

In yet another embodiment, a method for implementing a neural network system for training software embedded in an autonomous vehicle (AV) and for creating a built-in neural network for controlling the AV, said method including: encoding, by at least one computer disposed in the AV, a plurality of context2vec AV words encoded in a sequence of timing to embed data of context and behavior derived from sensor data of the AV in time sequences wherein the context and behavior data include: at least mapping, situational, and behavior data of the AV operation; selecting, by the at least one computer, a set of inputs to the neural network which include: at least one of a current, a prior, and a subsequent encoded context2vec AV word each represented in a one-hot scheme of a set of possibilities of context2vec AV words wherein at least one context2vec AV word of the set is designated with an ON state while other context2vec AV words of the set are designated in an OFF state; applying a neural network solution, by the at least one computer, to determine a target context2vec AV word of each set of the inputs based on the current context2vec AV word; computing an output vector, by the at least one computer, by the neural network that represents the embedded distributional one-hot scheme of the input encoded context2vec AV word; and controlling, by the at least one computer, a set of behavior control operations for controlling, a behavior of the AV based on the context2vec AV word.

In various embodiments, the method, further including: configuring a first, a second, a third, a fourth and a fifth part of the mapping, situational, and behavior data embedded in the context2vec AV word wherein the first part includes: intersection and stop mapping data; the second part which includes: clear distance ahead and time to collision situational data; the third part which includes: speed target and lane intention situational data; the fourth part which includes: clear distance ahead and expected maneuver behavior data; and the fifth part which includes: relative location and expected maneuver behavior data to enable a control action by the at least one computer of the AV.

The method, by the at least one computer further including: training of a set of context2vec words translated by the one-hot scheme of a size m neural network of context2vec AV words; composing with plus/minus n one-hot scheme of a neural network of context2vec AV words; and training the neural network with m+2n*m input nodes and m output nodes of context2vec AV words wherein m=number of input nodes selected for the size m neural network. The method further includes: the encoding data by the at least one computer further including: executing a set of context2vec AV words translated by the one-hot scheme of a size m neural network of context2vec AV words; composing with plus/minus n one-hot scheme of a neural network of context2vec AV words; presenting to a trained neural network of the composition with plus/minus n one-hot scheme of context2vec AV words; and outputting a set of context2vec AV word possibilities for control actions of the AV. The method, further including: constructing a hypothesis of a sequence of context2vec AV words of at least a size m wherein m=a size or number of the input nodes selected of the neural network of context2vec words; presenting to a trained neural network of an output of the context2vec AV words; inspecting the output of the context2vector AV words; and deciding an action for the AV by the at least one computer based on a result of the inspection of the context2vec AV words. The method, further including: analyzing by a Continuous Bag-of-Words model (CBOW) and/or a Skip-Gram model the context2vec AV words using the neural networks.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
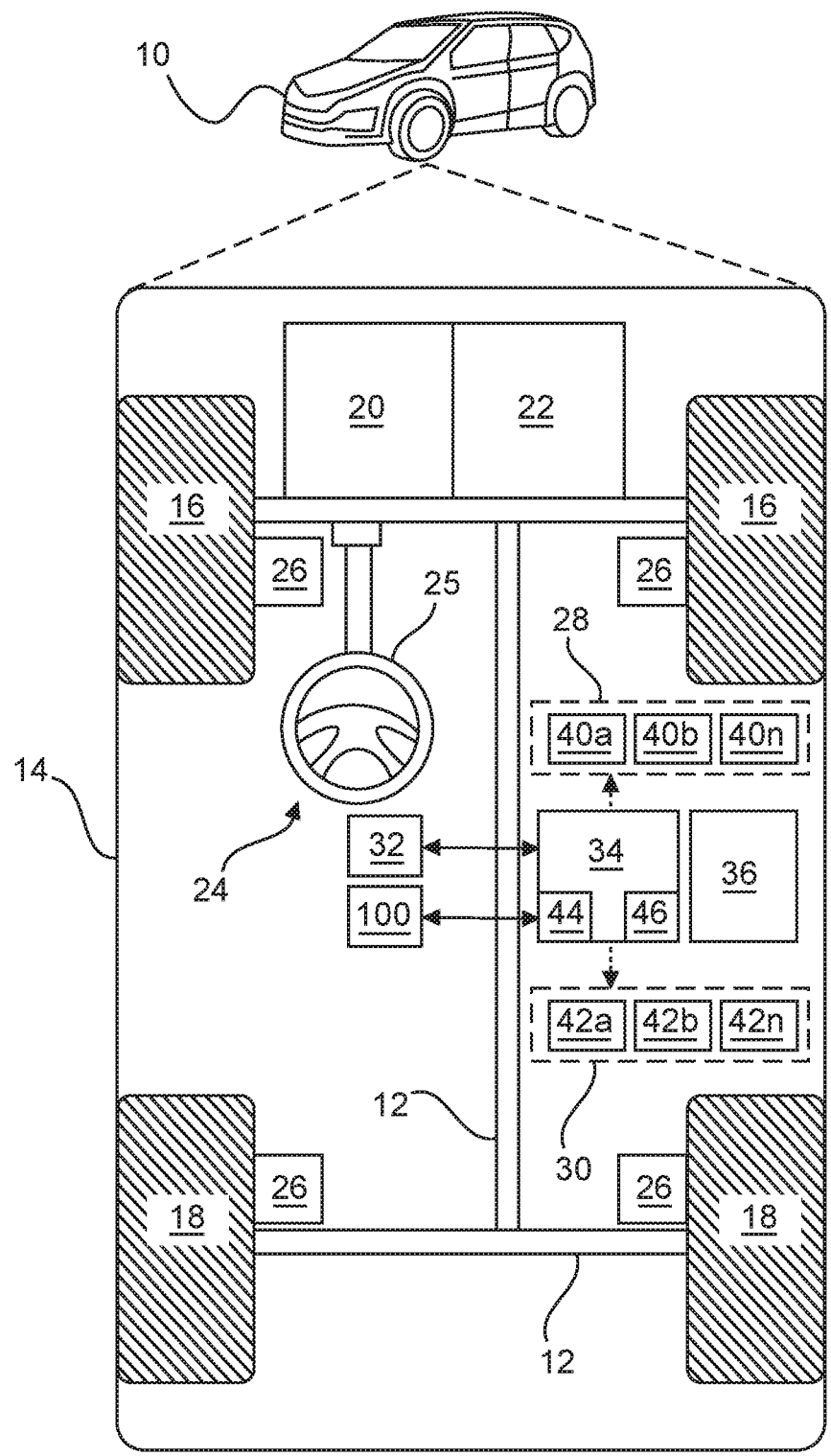
FIG. 1 illustrates a diagram depicting an example vehicle that includes a processor for embedding contextual information into a context to vector (context2vec) word for controlling an autonomous vehicle, in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description.

The subject matter described herein discloses apparatus, systems, techniques and articles for embedding contextual information into a vector context model or data structure to facilitate subsequent lookup, comparison, and hypothesizing operations associated with percepts of a neural network for determining the embedded encoding of context and behavior to instruct processors in the control of an autonomous vehicle (AV) based on sensed data.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The described techniques provide a method for generating context2vec models and data structures of the embedded contextual information to facilitate actuating context2vec nodes of a neural network and for comparisons and predictions of semantic meanings of context2vec AV words from a context mapped neural network of nodes of context2vec AV words which enables complex word sentences to be formed for generating control operations of the autonomous vehicle.

Briefly, a neural network is a computational graph where each node performs some kind of computation that provides an appropriate platform for vehicle control behavior in non-linear environmental conditions. This is because the neural networks can be used for both unsupervised and supervised learning which are suited for scenarios that arise during autonomous vehicle operations. In the present disclosure, the neural network may be considered a mapping of context2vec AV words for various scenarios related to autonomous vehicle operations and for use in controlling an autonomous vehicle by at least particular sets of target context2vec AV words and related context2vec AV words in a vicinity about a particular target context2vec AV word.

The context2vec representations of perceptions may be used in distributional models of perceptions and allow for the context2vec representations to capture semantic similarity as well as to be trained on large amounts of sensed data. The context2vec modeling provides a platform for capturing behaviors of autonomous vehicles during operations with surroundings. The shared intuition of the context2vec models of semantics provides a way to model a context2vec AV word (i.e. AV context2vec) by embedding the context2vec into a vector space or data structure. The process of word representation of an exemplary AV context2vec embedded with encoded data as a vector is often called an embedding operation.

Additionally, with the use of distributional semantics which entails the distributions of words context2vecs to induce vector-space embeddings of context2vecs; context2vecs can be encoded with semantic similarity. This enables instructional controls without a need for exact terminology, and can be used in matching similar driving scenarios where different terminology can or may describe very similar scenarios which can result in equivalent control maneuvers operated by the autonomous vehicle when driving. The similarity tests for the terminology of, as an example, two different context2vec AV words can be predicted to have a similarity between the context2vec AV words when a resultant computed (i.e. difference computed between words which are semantically similar in meaning) if a multiplier product between vectors of each word representation has a higher value when calculated. The neural networking modeling for sematic understanding of contextual context of such context2vec AV words in autonomous driving scenarios may use neural network models for the computations such as a conditional bag-of-words (CBOW) model and/or a skip-gram model of the context2vec AV word distributed representations to recognize context2vec AV word similarities or associations in such context2vec AV words that are formed to describe various driving scenarios and for the control operations of the autonomous vehicle tasks in such driving scenarios.

In various exemplary embodiments, the vector space data structure or model may be deemed a computationally efficient predictive model for learning embeddings from raw data derived from autonomous vehicle sensors. The operations used in the predictive model of the context2vec AV words can support various contextual hypothesis situations such as "what if" scenarios (e.g. "What if there's a car not seen readily behind a big truck?") and subsequent control behavior changes needed to be implemented by the autonomous vehicle. In addition, a pre-compiled decision-making instruction set derived from each driving scenario can be used which in turn reduces run-time execution cycles when processing the raw sensed data as the decision-making instructional has already been compiled.

In various exemplary embodiments, the distributed representations of context2vec AV words in a context2vec space may help learning algorithms when the learning algorithms are executed by processors of an autonomous vehicle to achieve a better performance in autonomous vehicle behavior planning tasks by a grouping of similar context2vec AV words which can be processed effectively to control vehicle operations. The context2vec space model is a computationally efficient predictive model for learning embeddings from the raw data sensed data. In addition, the related algebraic operations support the "what if" and the subsequent behavior changes described earlier that may occur during a vehicle operation for a quicker processing.

FIG. 1 illustrates a block diagram depicting an example vehicle that may include a processor for embedding contextual information into a context2vec system 100. In general, the embedded contextual information into a context2vec model or data structure system (or simply "system") determines the similarity of instructional terms for control of an autonomous vehicle using various context2vec AV words processed by the context2vec neural network based model in the system or connected to the system.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As an example, the system 100 may include any number of additional sub-modules embedded within the controller 34 which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
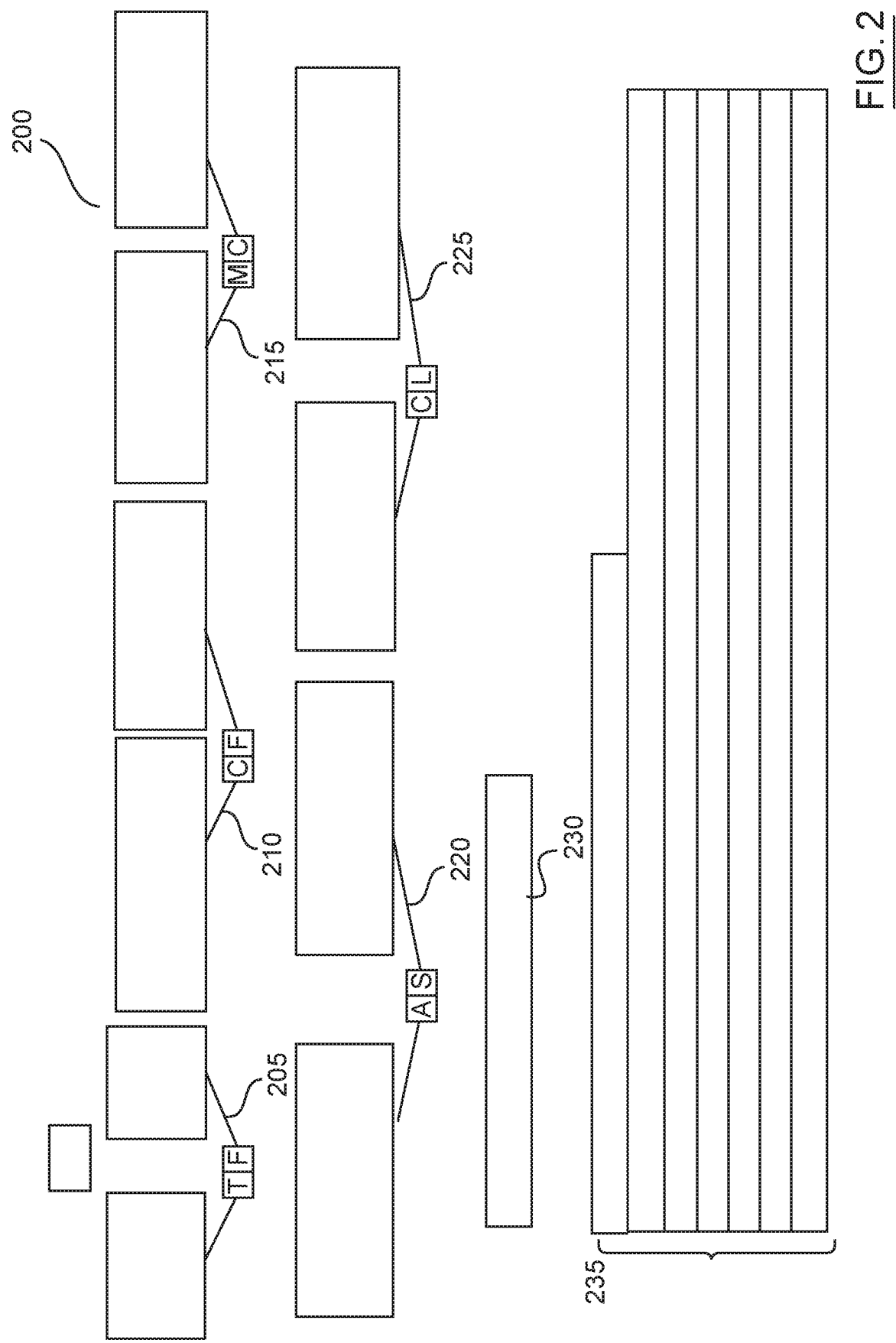
FIG. 2 illustrates a diagram of forming AV context2vec words where each position in a word encodes some aspect of AV information for processing and embedding contextual information into a context2vec data structure for controlling an autonomous vehicle, in accordance with an embodiment.

FIG. 2 illustrates a diagram for forming an exemplary embodiment of context2vec AV words, via having context2vec AV words selected from a natural language dictionary (such as in word2vec), where each character position in a word encodes some aspect of AV information for processing of embedding contextual information into a context2vec vector space model for controlling an autonomous vehicle in accordance with an embodiment. That is, context2vec vector brings extra sematic features that enable better AV context classification. In FIG. at 205, an exemplary embodiments, two letters of a AV "word" encode map-related information. The first character encodes whether an intersection is relevant and the letter can be T if true or F if false. The second character encodes whether a stop is relevant and is also encoded as a T or F. At 210, the next two letters of the AV word being constructed encodes context related to the "situation" around the AV. "Clear Distance Ahead" indicates how close the host vehicle is to a vehicle ahead of it in its lane and encodes one of three level designations of "C" for "close" to a situation, "M" for moderate, and "F" for far The second "situation" letter of the word encodes "Time to Collision", which indicates how imminent collision a collision is with a lead vehicle, with again three levels of designation of "S" for a collision occurring "soon", "M" for a collision occurring in a moderate time, and "F" for a collision occurring in a "far" or distant time. At 215, more characters of the AV word being created encode "behavior" and includes targeted speeds in the first letter and intent making a lane change into an adjacent lane. For the speed target character, a three level threshold or labeling of the attributes or actions of behavior is put forth, and includes: a "S" slow, "M" moderate, and "F" fast designation for a targeted speed. For the lane change intent letter, a "L" left, "C" current and "R" right lane change or maintenance by the AV encode lane change intent. At 220, letters in the AV word being constructed encodes information related to 2 (can be a different number) other objects in the environment. For example, at 220, one character encodes the "relative location" of "Situation Object 1" where character "A" encodes that the other object is ahead of the host vehicle, "B" behind, or "C" crossing the vehicle. In 220, a second character encodes the predicted expected maneuver for object 1, with the nomenclature of "S" for a prediction that the other object with go straight, "L" for a prediction that it will turn left and "R" for a predication that it will turn right. In addition 225, the two characters are similarly encode information related to a "Situation Object 2" is defined as objects at a "relative location" The current context word or context2vec AV word can be defined by aggregating each of the particular AV letters for example in this case at 230 is defined as "TFCFMCASL" of the particular attributes of the map location, situation, behavior, and situation of the objects 1 and 2. That is, "TFCFMCASCL" a concatenation of each character of the AV letters 200. At 235, a "sentence" (in the natural language domain parlance of word2vec) which is equal to time series of contexts of particular times from t−5 to t−1 to now. In the example in FIG. 2, each step in time indicates a dynamic change of context that occurs. For example at t−3 the intersection becomes relevant, at t−2 "we get closer to the vehicle ahead", at t−1 "the vehicle ahead turns right rather than goes straight" and finally at "now" the "time to colliding with the vehicle ahead gets smaller". The total number of AV words, "M" (analogous to the number of words chosen from a natural language dictionary in the natural language domain of word2vec) is determined by the combinatorics of the possible values of all of the AV word's individual letters.

Figure 3:
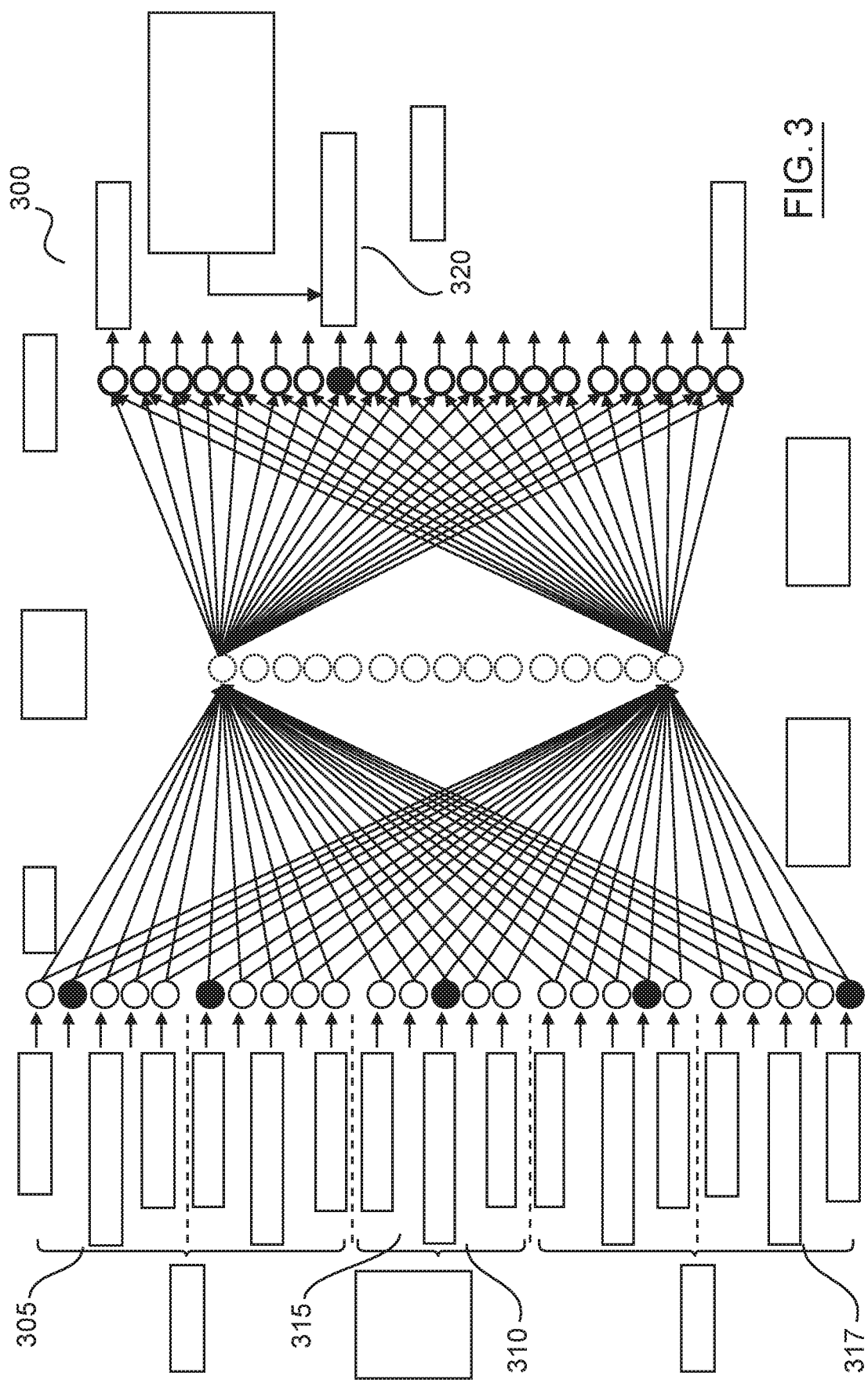
FIG. 3 illustrates a diagram of inputs and outputs for targeting context and behavior of AV context2vec words for processing of the embedded contextual information in a context2vec data structure for controlling an autonomous vehicle, in accordance with an embodiment.

FIG. 3 illustrates a diagram of inputs and outputs for targeting context and behavior of autonomous vehicle (AV) words for processing of the embedded contextual information in a vector space model for controlling an autonomous vehicle in accordance with an embodiment. In FIG. 3, the "context2behavior" are a set of AV context words where a context equals a set of +−/n "one-hot" set of AV words that surround a particular (usually the current) AV word. The input/output diagram 300 attempts to optimize a sequence of an AV driving context of AV words from AV word "0" to AV word(M). The context window is a size "N" which of the number of AV words prior to the target AV word and ahead (in the future) of the target AV word. In an exemplary embodiment, a neural network model of a skip-gram model, can be used for a particular sequence described by a set of AV words of an AV driving context of: AV Word0 (w0), AV word1(w1) . . . AV wordn (wn) for which a similarity matching to a set of instructions to control the autonomous vehicle to a particular surrounding context described by the AV words. The neural network based skip-gram model is trained by optimizing the following expression:

$$\max \frac{1}{T} \sum_{t=0}^{T} \sum_{-n \le i \le n, i \ne 0} \log p(w_{t+i} \mid w_t).$$

Where n is the size of the training context window (i.e. N=5).

The exemplary skip-gram model uses the following definition for the $P(w_{t+1}|w_t)$ term in the above expression:

$$p(w_i \mid w_j) = \frac{\exp(v'^T_{w_i} v_{w_j})}{\sum_{w=1}^{W} \exp(v'^T_{w_i} v_{w_j})}$$

Where $v_w$ and $v'_w$ are respectively the input and output vector representations of AV wordn (wn) and "W" is the total number of words in the vocabulary. In the case of an efficient implementation of this model, a hierarchical soft-max can be used as an approximation of a probability in place of the above soft-max probability.

In an exemplary embodiment, an AV word of "FFCFM-CASCL" at 305 is processed as a context AV word at t−2, the same AV word was seen at t−1, and a target context and behavior AV word at t=0 is determined as "TCFMCASCL" at 310, and projected AV words at t+1 and t+2 are presented at 315 as "TFMFMCASCL" and at 317 as "TFMFM-CARCL" respectively. These inputs are processed via the hidden layer (i.e. active node layer) to an output "TFMSM-CASCL" at 320. The embedding indicates slowing down (from moderate M to slow S in the speed target character in the current input context of the output AV word) when the time to contact (TTC) and other context requirements are processed.

Figure 4:
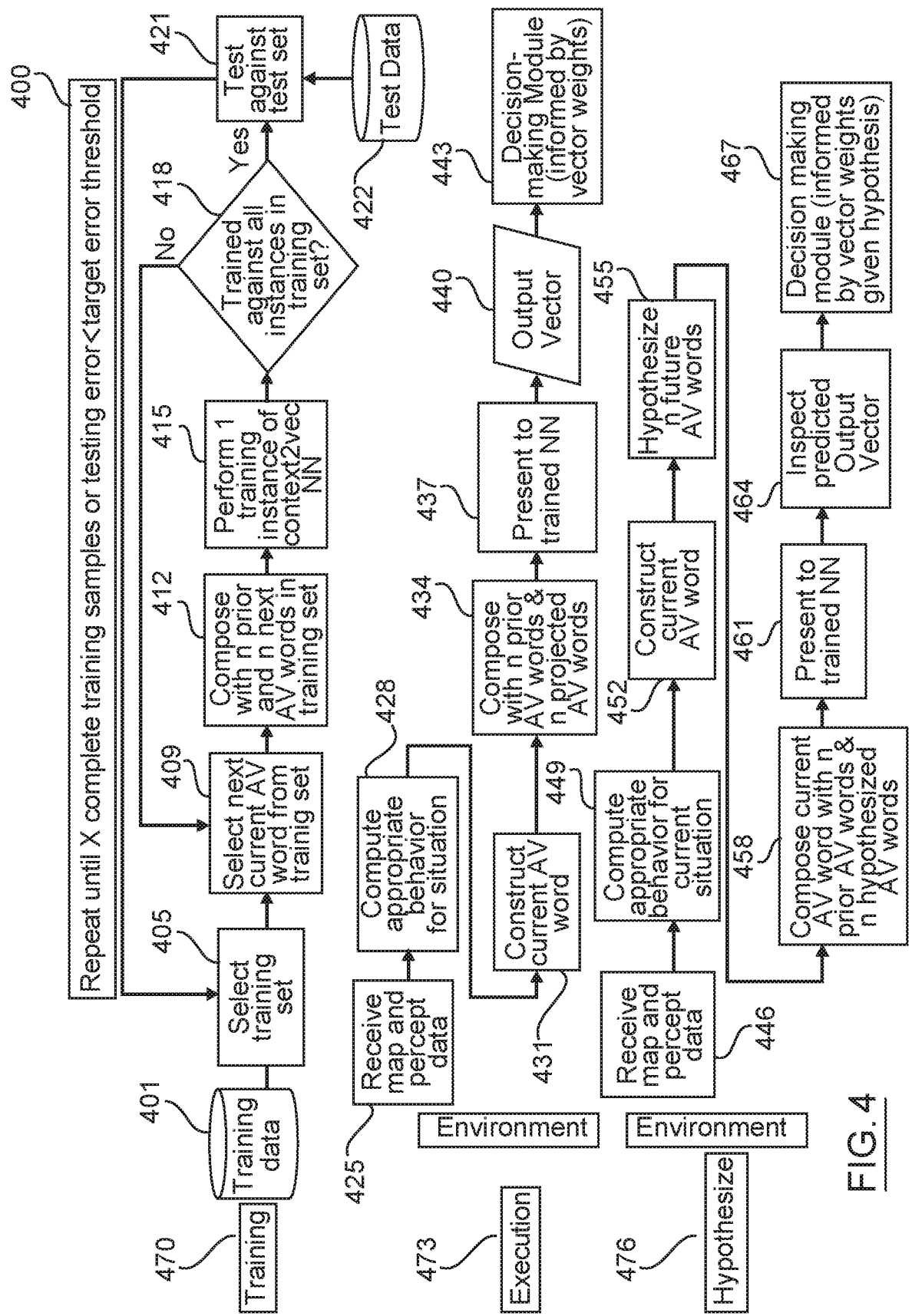
FIG. 4 illustrates a flowchart of the embedded encodings of contextual information with the context2vec data structure, in accordance with an exemplary embodiment.

FIG. 4 illustrates a flowchart of the embedded encodings of contextual information with the context2vec space modeling in accordance with an exemplary embodiment. The AV words (based on map data, percepts, and behavior) refer to non-host vehicle objects or environment from which an impression of the object or environment is either obtained or created by sensing operations of the sensors of the autonomous vehicle and by an exemplar behavior control module to determine the behavior components. In various exemplary embodiments, one-hot encodings may be used in modeling representations of the AV words to represent the data where at the first level of (i.e. the "input") the input context2vec neural network.

The flowchart 400 of the vector module includes three distinct uses of the context2vec modeling: a training 470 use, an execution 473 use, and a hypothesize 476 use. The training 470 use includes initially at 401 a training set of data of which a training set is selected 405. After which, the flow proceeds to select the next current AV word from the training set 409. In other words, the selected 405 training set and the selection of the next current AV word from the training set (until fully trained) to translate a context into AV words and present to the neural network in a "one-hot" representation of size "M", where only 1 of the "M" inputs is one and the rest zero. The training set is composed at 412 with a set with "n" prior and "n" next AV words in of training set (i.e. composing with "+/−n" AV words). Next, at 415, there is performed a first training (this may be repeated for more training samples) of the context2vec AV words of the neural network (NN). Then, at 418, a determination is made against all instances (i.e. of contexts of context2vec AV words) or whether all instances in the training set have been trained (i.e. all current AV words have been trained), if not the flow repeats the training cycle and returns to select the next current AV word from the training set at 409. After a determination that the selected training set has been trained at 418, the flow proceeds to test the trained neural network against a test set at 421 from a test data 422. The test data may be a divided sample of an entire set of AV words, or other data test set of AV words as required with sufficient data to test the neural network to ensure accurate results. The training results after completions of testing of the trained neural network "NN" has "m+2n*m" input nodes (each AV word is m long and there are "n" prior AV words and "n" future' AV words), one hidden layer and m output nodes. The testing against the trained set is repeated until "x" complete training samples or a testing error is less than a target error.

Next, the execution 473 use includes at 425 receiving map and percept data (i.e. AV word data) to compute an appropriate behavior for the situation 428. Then, to construct a current AV word at 431 to compose at 434 "n" prior AV words and "n" projected AV words; to translate AV words into "one-hot" space of size "m", composed with "n" prior contextual samples and "n" future expected contextual samples. Next, to present the one hot space of AV words at 437 to the trained neural network (NN) and to generate output vector probabilities at 440. After which, at 443 to enable a decision making module which is informed by the resulting probability distribution at the output (i.e. informed by vector weights).

The final use, the hypothesize 476 use, entails at 446 receiving map and percept data (i.e. AV word data) to compute an appropriate behavior for the current situation 449. Then at 452, to construct a current AV word 452 for hypothesizing at 455 future AV words. That is, to compose at 458 a current AV word with "n" prior AV words and "n" hypothesized AV words such as constructing hypothetical AV word sequences of size m+2*m*n. Next, at 461 to present the constructed hypothetical AV word sequence to the trained neural network (NN) (i.e. the trained NN by the training 470). After which, to inspect at 464 the predicted output vector and finally, at 467 formulating the decision making modules informed by the hypothesis (i.e. informed by the vector weights given by the hypothesis).

Figure 5:
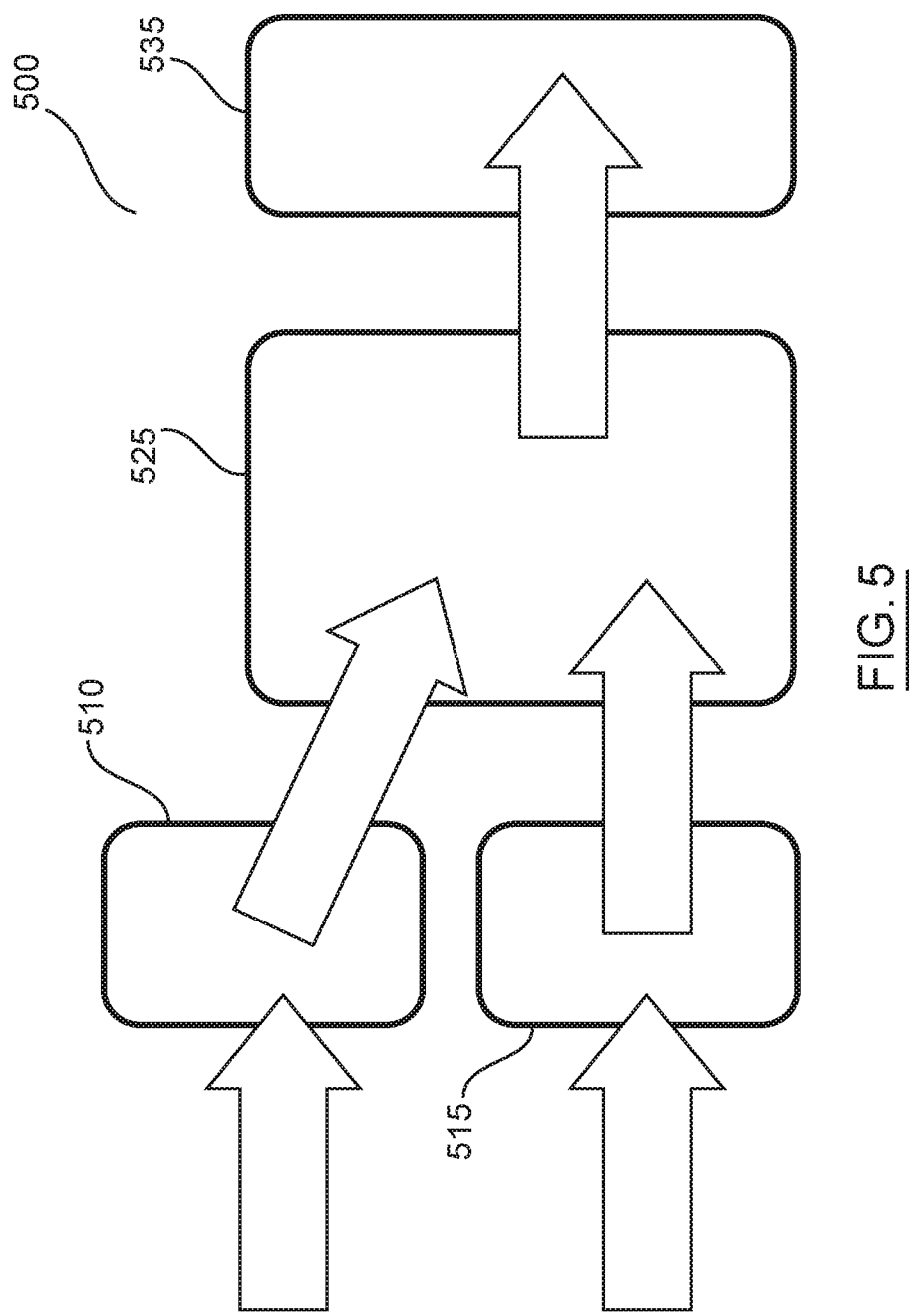
FIG. 5 illustrates a diagram of a control system of the vehicle with an AV context2vec functional decomposition for vehicle behavior and trajectory planning, in accordance with an exemplary embodiment.

FIG. 5 illustrates a diagram of a control system of the vehicle with AV functional decomposition for vehicle behavior and trajectory planning in accordance with an embodiment. In FIG. 5, in a first part of a path planning module 510 of map planning which takes place and entails receiving inputs of road level plan high definition map details and then formulating by various algorithmic solutions to a detailed lane-level path plan. In a second part of a situation awareness module 515 where information of situational awareness is generated and entails receiving inputs of perception data of a map detail and formulating by various algorithmic solutions other object details and risk assessments. Both outputs from modules 510, 515 are sent to a behavior planning module 525 for generating maneuver directive and motion constraints for control of a vehicle (i.e. an autonomous vehicle). From the data of the maneuver directions and motion constraints, trajectory planning, by the trajectory planning module 535, may be formulated.

Figure 6:
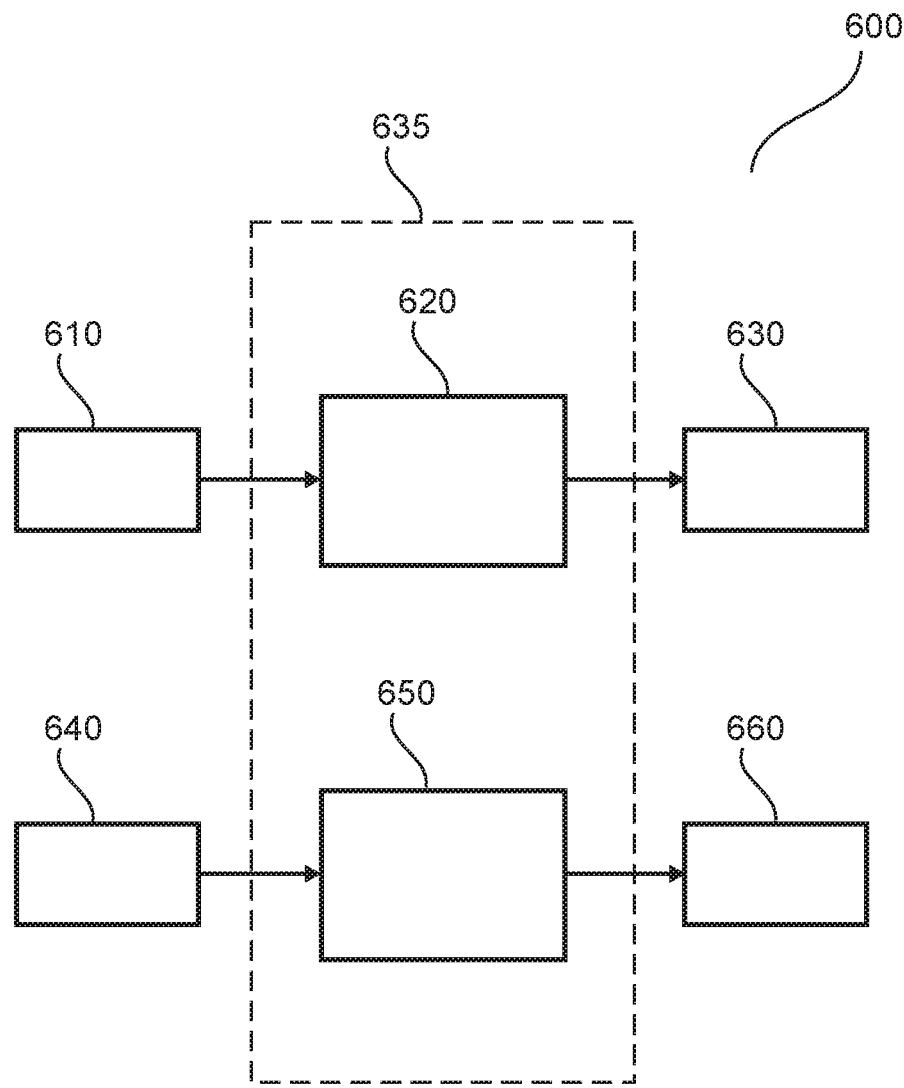
FIG. 6 illustrates a neural network model of a Continuous Bag-of-Words model (CBOW) and/or the Skip-Gram models for learning context2vec AV words, in accordance with an exemplary embodiment.

FIG. 6 illustrates a neural network processed by using a Continuous Bag-of-Words model (CBOW) and/or the Skip-Gram model for learning word embeddings in accordance with an exemplary embodiment. As described earlier, a context2vec is a particularly computationally efficient predictive model for learning word embeddings and a neural network 635 may be processed using a Continuous Bag-of-Words model (CBOW) and/or the Skip-Gram model to process the context2vec AV words. The CBOW predicts target context2vec words 630 (e.g. obstacle near ahead) from source (input) context2vec AV words 610 ("car pulls in front from driveway"), while the skip-gram does the inverse and predicts source context2vec AV words at 660 from the target (output) context2vec AV words 640 via a function 650. In the skip-gram model a neural network 635 is trained over a large corpus (i.e. 40 k context2vec AV words) where the training objective is to learn context2vec representations that are good approximation to predict nearby AV context2vec AV words. The skip-gram model is trained by optimizing the following expression where $v_w$ and $v'_w$ are respectively the input and output vector representations of context 2vec w:

$$p(w_i | w_j) = \frac{\exp(v'^T_{w_i} v_{w_j})}{\sum_{w=1}^{W} \exp(v'^T_{w_i} v_{w_j})}.$$

The CBOW operates in the same manner as the skip-gram model but the direction is inverted. In other context2vec AV words in CBOW are trained by a binary logistic classifier w(t) at 630 where, given a window of context2vec AV words (wt-2) at 610 which are summed (or other function computed) at 620. This enables a higher probability to determine the context2vec AV word is "correct" if the next context2vec AV word is correct and a higher probability to determine if the context2vec AV word is "incorrect". The CBOW smoothes over a lot of the distributional data (by treating an entire context as one set of data). For the most part, this turns out to be a useful for smaller datasets. However, skip-gram treats each context-target pair as a new data sets, and this tends for better results with larger datasets.

Given a sequence of AV driving context: context2vec AV Word0 (w0), AV word1(w1) . . . AV wordn (wn); the model tries to optimize:

$$\max \frac{1}{T} \sum_{t=0}^{T} \sum_{-n \leq i \leq n, i \neq 0} \log p(w_{t+i} | w_t).$$

Where n is the size of the training context window (i.e. n=5).

In the above skip-gram model, the following is used:

$$p(w_i | w_j) = \frac{\exp(v'^T_{w_i} v_{w_j})}{\sum_{w=1}^{W} \exp(v'^T_{w_i} v_{w_j})}.$$

Where $v_w$ and $v'_w$ are respectively the input and output vector representations of w. W is the total number of words in the vocabulary. Note that for efficient implementation The hierarchical SoftMax can be used to approximate the above SoftMax probability. In conjunction with a higher level training process: there is an input layer: where 'n' previous context2vec AV words are encoded using 1-hot (1-of-V) coding and where V is the total size of the vocabulary in the training set. The hidden layer is the intermediate layer of the neural network and the input layer is projected to an internal hidden layer in the configuration of the neural network. The output is a SoftMax as discussed above and is applied to the logits obtained from the hidden layer.

Described herein are techniques for of inputs and outputs for targeting context and behavior of autonomous vehicle (AV) words for processing of the embedded contextual information in a context2vec model for controlling an autonomous vehicle. The apparatus, systems, techniques and articles provide an neural network system for sematic understanding of context and behavior of a vehicle within a particular surroundings.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A computer-implemented system for controlling an autonomous vehicle (AV), the system comprising:
    a non-transitory computer-readable medium containing a set of instructions for programming at least one computer, the at least one computer comprising:
    a neural network having a plurality of nodes with context to vector (context2vec) contextual embeddings to enable operations of the AV;
    a plurality of encoded context2vec AV words in a sequence of timing to embed data of context and behavior derived from sensor data of the AV in time sequences wherein the context and behavior data comprise: at least mapping, situational, and behavior data of the AV operation are configured into sets of multiple parts that comprise: intersection and stop mapping data, clear distance ahead and time to collision situational data, speed target and lane intention situational data, clear distance ahead and expected maneuver behavior data, and relative location and expected maneuver behavior data to enable a control action by the at least one computer;
    a set of inputs to the neural network which comprise: at least one of a current, a prior, and a subsequent encoded context2vec AV word each represented in a one-hot scheme of a set of possibilities of context2vec AV words wherein at least one context2vec AV word of the set is designated with an ON state while other context2vec AV words of the set are designated in an OFF state;
    a neural network solution applied by the at least one computer to determine a target context2vec AV word of each set of the inputs based on the current context2vec AV word;

an output vector computed by the neural network that represents the embedded distributional one-hot scheme of the input encoded context2vec AV word; and a set of behavior control operations for controlling, by the at least one computer, a behavior of the AV based on the context2vec AV word.

2. The system of claim 1, the mapping, situational, and behavior data embedded in the context2vec AV word further comprising:

a first, a second, a third, a fourth and a fifth part wherein the first part comprises: intersection and stop mapping data; the second part which comprises: clear distance ahead and time to collision situational data; the third part which comprises: speed target and lane intention situational data; the fourth part which comprises: clear distance ahead and expected maneuver behavior data; and the fifth part which comprises: relative location and expected maneuver behavior data to enable a control action by the at least one computer of the AV.

3. The system of claim 1, the plurality of context2vec AV words encoded in a sequence of timing further comprising:

a prior, current and subsequent sequence of timestamps for each set of context2vec AV words.

4. The system of claim 1, further comprising:

a training of a set of context2vec AV words translated by the one-hot scheme of a size m neural network of context2vec AV words;

a composition with plus/minus n one-hot scheme of a neural network of context2vec AV words; and a training of the neural network with $m+2n*m$ input nodes and m output nodes of context2vec AV words wherein m=number of input nodes selected for the size m neural network.

5. The system of claim 1, further comprising:

an execution of a set of context2vec AV words translated by the one-hot scheme of a size m neural network of context2vec AV words;

a composition with plus/minus n one-hot scheme of a neural network of context2vec AV words;

a presentation to a trained neural network of the composition with plus/minus n one-hot scheme of context2vec AV words; and a set of output of context2vec AV word possibilities for control actions of the AV.

6. The system of claim 1, further comprising:

a construction of a hypothesis of a sequence of context2vec AV words of at least a size m wherein m=a size or number of input nodes selected of the neural network of context2vec AV words;

a presentation to a trained neural network of an output of the context2vec AV words based on the hypothesis;

an inspection of the output of the context2vec AV words; and a decision of an action for the AV by the at least one computer based on a result of the inspection of the context2vec AV words.

7. The system of claim 1, further comprising:

a Continuous Bag-of-Words model (CBOW) and/or a Skip-Gram model using neural networks for analysis of the context2vec AV words.

8. An apparatus for implementing a neural network system for training software embedded in an autonomous vehicle (AV) and for creating a built-in neural network for controlling the AV, the apparatus comprising:

at least one processor deployed on a computing device within the AV, the at least one processor being programmed to implement applications to generate control data for an AV based on sensor data from sensors deployed on the AV wherein the at least one processor having an input coupled to the sensors to receive the sensor data;

the at least one processor having an associated memory for storing data of context to vector (context2vec) words of AV words for use in controlling the AV;

the at least one processor having a neural network having a plurality of nodes with context to vector (context2vec) contextual embeddings to enable operations of the AV;

the at least one processor encoding a plurality of context2vec AV words in a sequence of timing to embed data of context and behavior derived from sensor data of the AV in time sequences wherein the context and behavior data comprise: at least mapping, situational, and behavior data of the AV operation of parts in a set that comprise one or more of: a first part of intersection and stop mapping data, a second part which comprises: clear distance ahead and time to collision situational data, a third part which comprises: speed target and lane intention situational data, a fourth part which comprises: clear distance ahead and expected maneuver behavior data, and a fifth part which comprises: relative location and expected maneuver behavior data to enable a control action by the at least one processor;

the at least one processor with a set of inputs to the neural network which comprise: at least one of a current, a prior, and a subsequent encoded context2vec AV word each represented in a one-hot scheme of a set of possibilities of context2vec AV words wherein at least one context2vec AV word of the set is designated with an ON state while other context2vec AV words of the set are designated in an OFF state;

the at least one processor executing a neural network to determine a target context2vec AV word of each set of the inputs based on the current context2vec AV word;

the at least one processor enabling an output vector computed by the neural network that represents the embedded distributional one-hot scheme of the input encoded context2vec AV word; and the at least one processor controlling, by a set of control actions, a behavior of the AV based on the context2vec AV word.

9. The apparatus of claim 8, the mapping, situational, and behavior data embedded in the context2vec AV word further comprising:

a first, a second, a third, a fourth and a fifth part wherein the first part comprises: intersection and stop mapping data; the second part which comprises: clear distance ahead and time to collision situational data; the third part which comprises: speed target and lane intention situational data; the fourth part which comprises: clear distance ahead and expected maneuver behavior data; and the fifth part which comprises: relative location and expected maneuver behavior data to enable a control action by the at least one computer of the AV.

10. The apparatus of claim 8, the plurality of context2vec AV words encoded in a sequence of timing further comprising:

a prior, current and subsequent sequence of timestamps for each set of context2vec AV words.

11. The apparatus of claim 8, further comprising:

the at least one processor configured to:

train of a set of context2vec AV words translated by the one-hot scheme of a size m neural network of context2vec AV words;
compose with plus/minus n one-hot scheme of a neural network of context2vec AV words; and
train the neural network with m+2n*m input nodes and m output nodes of context2vec AV words wherein m=number of input nodes selected for the size m neural network.

12. The apparatus of claim 8, further comprising:
the at least one processor configured to:
execute a set of context2vec AV words translated by the one-hot scheme of a size m neural network of context2vec AV words;
compose with plus/minus n one-hot scheme of a neural network of context2vec AV words;
present to a trained neural network the composition with plus/minus n one-hot scheme of context2vec AV words; and
output a set of context2vec AV word possibilities for control actions of the AV.

13. The apparatus of claim 8, further comprising:
the at least one processor configured to:
construct a hypothesis of a sequence of context2vec AV words of at least a size m wherein m=a size or number of input nodes selected of the neural network of context2vec AV words;
present to a trained neural network of an output of the context2vec AV words based on the hypothesis;
inspect the output of the context2vector AV words; and
decide an action for the AV based on a result of the inspection of the context2vec AV words.

14. The apparatus of claim 8, further comprising:
the at least one processor configured to:
a Continuous Bag-of-Words model (CBOW) and/or a Skip-Gram model using neural network for analysis of the context2vec AV words.

15. A method for implementing a neural network system for training software embedded in an autonomous vehicle (AV) and for creating a built-in neural network for controlling the AV, said method comprising:
encoding, by at least one computer disposed in the AV, a plurality of context2vec AV words encoded in a sequence of timing to embed data of context and behavior derived from sensor data of the AV in time sequences wherein the context and behavior data comprise: at least mapping, situational, and behavior data of the AV operation;
configuring one or more parts of a first, a second, a third, a fourth and a fifth part of the mapping, situational, and behavior data embedded in the context2vec AV word wherein the first part comprises: intersection and stop mapping data; the second part which comprises: clear distance ahead and time to collision situational data; the third part which comprises: speed target and lane intention situational data; the fourth part which comprises: clear distance ahead and expected maneuver behavior data; and the fifth part which comprises: relative location and expected maneuver behavior data to enable a control action by the at least one computer of the AV;
selecting, by the at least one computer, a set of inputs to the neural network which comprise: at least one of a current, a prior, and a subsequent encoded context2vec AV word each represented in a one-hot scheme of a set of possibilities of context2vec AV words wherein at least one context2vec AV word of the set is designated with an ON state while other context2vec AV words of the set are designated in an OFF state;
applying a neural network solution, by the at least one computer, to determine a target context2vec AV word of each set of the inputs based on the current context2vec AV word;
computing an output vector, by the at least one computer, by the neural network that represents the embedded distributional one-hot scheme of the input encoded context2vec AV word; and
controlling, by the at least one computer, a set of behavior control operations for controlling, a behavior of the AV based on the context2vec AV word.

16. The method of claim 15, further comprising:
configuring a first, a second, a third, a fourth and a fifth part of the mapping, situational, and behavior data embedded in the context2vec AV word wherein the first part comprises: intersection and stop mapping data; the second part which comprises: clear distance ahead and time to collision situational data; the third part which comprises: speed target and lane intention situational data; the fourth part which comprises: clear distance ahead and expected maneuver behavior data; and the fifth part which comprises: relative location and expected maneuver behavior data to enable a control action by the at least one computer of the AV.

17. The method of claim 15, by the at least one computer further comprising:
training of a set of context2vec words translated by the one-hot scheme of a size m neural network of context2vec AV words;
composing with plus/minus n one-hot scheme of a neural network of context2vec AV words; and
training the neural network with m+2n*m input nodes and m output nodes of context2vec AV words wherein m=number of input nodes selected for the size m neural network.

18. The method of claim 15, the encoding data by the at least one computer further comprising:
executing a set of context2vec AV words translated by the one-hot scheme of a size m neural network of context2vec AV words;
composing with plus/minus n one-hot scheme of a neural network of context2vec AV words;
presenting to a trained neural network of the composition with plus/minus n one-hot scheme of context2vec AV words; and
outputting a set of context2vec AV word possibilities for control actions of the AV.

19. The method of claim 15, further comprising:
constructing a hypothesis of a sequence of context2vec AV words of at least a size m wherein m=a size or number of the input nodes selected of the neural network of context2vec words;
presenting to a trained neural network of an output of the context2vec AV words;
inspecting the output of the context2vector AV words; and
deciding an action for the AV by the at least one computer based on a result of the inspection of the context2vec AV words.

20. The method of claim 15, further comprising:
analyzing by a Continuous Bag-of-Words model (CBOW) and/or a Skip-Gram model the context2vec AV words using the neural networks.

* * * * *